Feb. 20, 1962  G. C. BARNETTE  3,021,751
TACHISTOSCOPES
Filed May 26, 1960
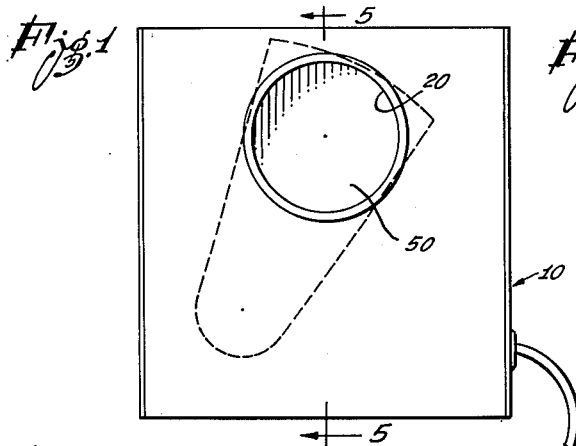
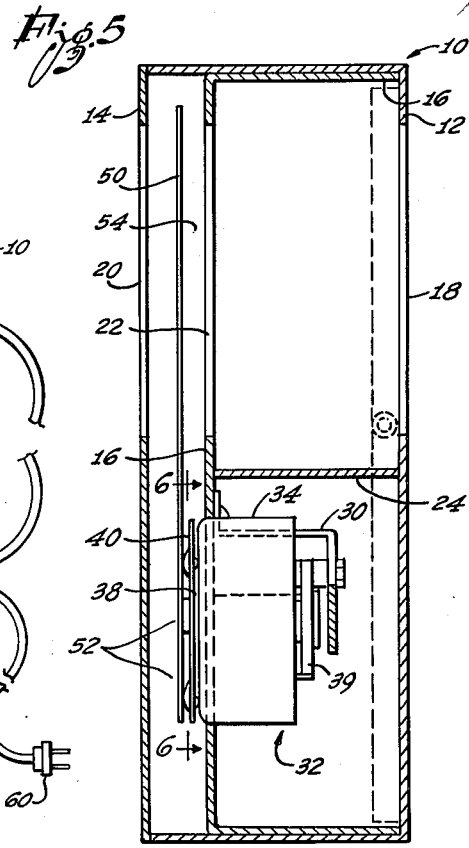
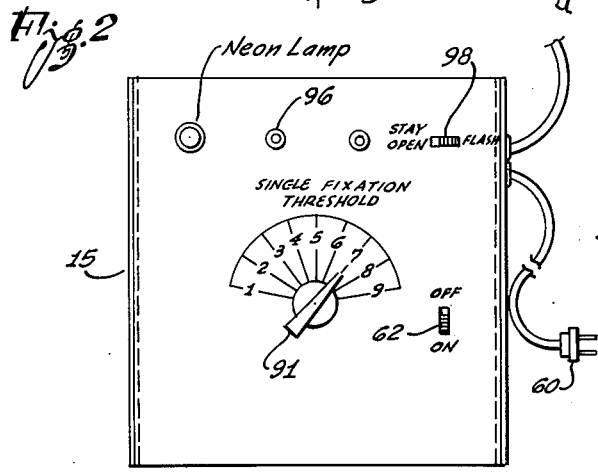
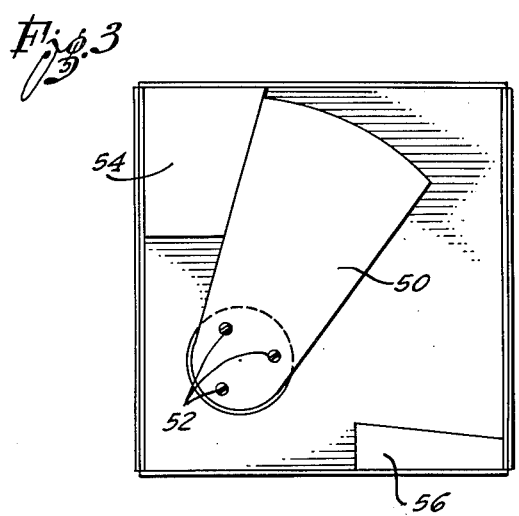
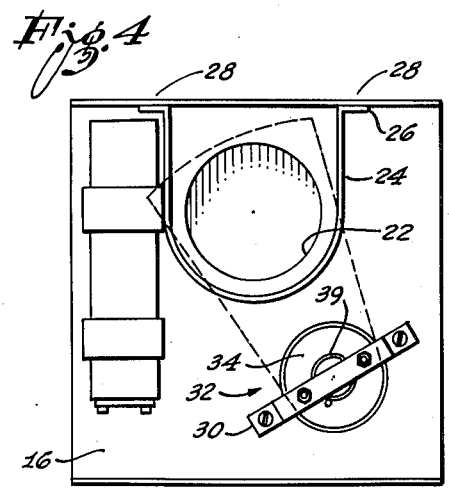
INVENTOR
Gaspar Cisneros Barnette
By Keith D. Beecher
Attorney Feb. 20, 1962     G. C. BARNETTE     3,021,751
TACHISTOSCOPES
Filed May 26, 1960     2 Sheets-Sheet 2
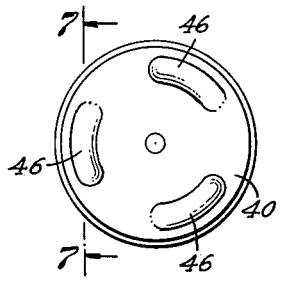
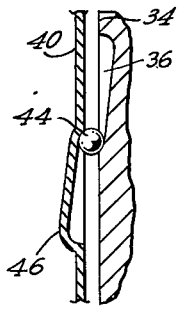
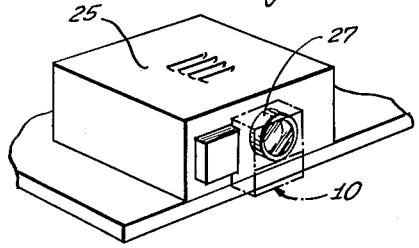
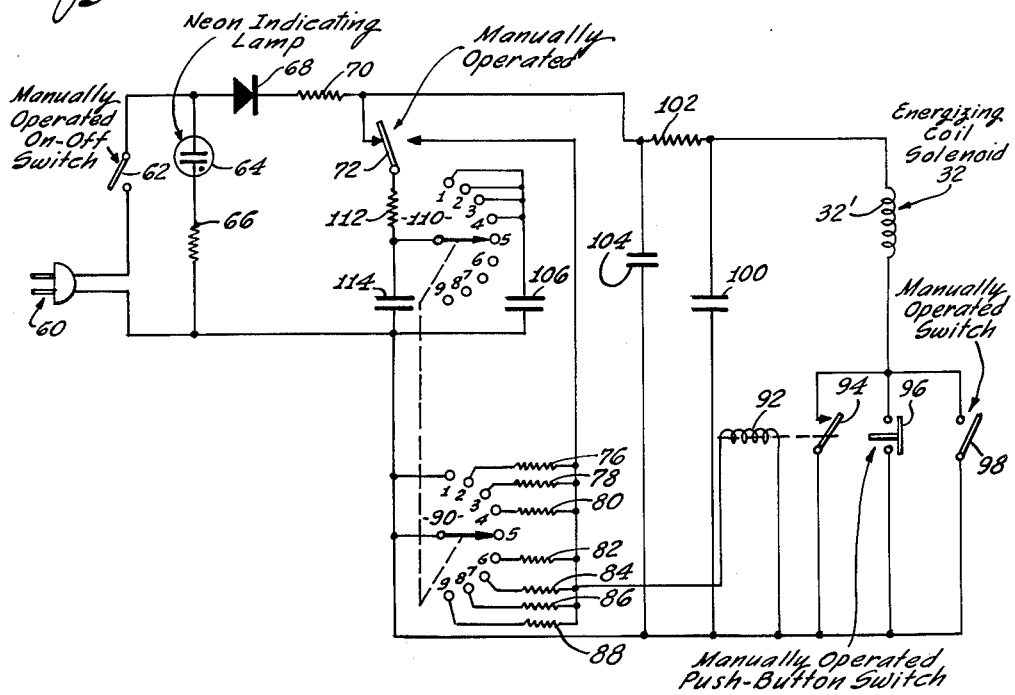
INVENTOR:
Gaspar Cisneros Barnette
By Kieth D. Beecher
Attorney.

United States Patent Office 3,021,751
Patented Feb. 20, 1962

3,021,751
TACHISTOSCOPES
Gaspar Cisneros Barnette, Sunland, Calif., assignor to Learning Through Seeing, Inc., Sunland, Calif., a corporation of California
Filed May 26, 1960, Ser. No. 31,931
5 Claims. (Cl. 88—20)

This invention relates to tachistoscopes and more particularly to apparatus for controlling the time during which an image may be projected onto a viewing screen. The invention is especially adapted to be used in connection with tests for determining the reading ability of different people, and in connection with instructions and courses for helping to improve the speed at which people can read written material.

This application is a continuation-in-part of copending application Serial No. 530,853 which was filed August 23, 1955 and now abandoned.

Much attention has been devoted in recent years to the reading ability of different people. These tests indicate that many intelligent people do not read very quickly, or at least not as quickly as their intelligence might indicate they should. The tests have further indicated that the speed at which people read and comprehend written material can be considerably increased with proper training.

It has been found that the tests and subsequent training of people can be accomplished by projecting words onto a viewing screen for controlled periods of time. By controlling the periods of time during which different words are project onto the viewing screen, the reader is provided with the amount of time necessary for an average person to make one or more fixations on the written material. Since a person tends to read and absorb the contents of a group of words in each fixation, the amount of material absorbed by each reader can be compared with the amount of material absorbed by others. This comparison can be made for the different periods during which an image may be projected onto the viewing screen.

Apparatus has been developed in the past to perform the above functions, but such apparatus has not proved to be entirely satisfactory. One reason for the lack of satisfaction in the prior art apparatus has been the excessive cost of the various types of apparatus previously developed. Since the progress in the tachistoscope field is relatively recent, there has been a natural hesitation on the part of educators and school boards to invest large amounts of money for equipment. It has also been found that many types of prior art apparatus of this general type have not operated satisfactorily under all circumstances.

The present invention provides apparatus which is inexpensive and reliable. The projections on the viewing screen may be made by means of any standard projector, and the apparatus and unit of the present invention may be simply hung on the lens housing of such a projector, with the lens housing extending into an opening in the apparatus of the invention.

The embodiment of the invention to be described includes a pivotable shutter which is normally disposed across the opening in the apparatus so as to block the projection of an image from the projector onto the viewing screen. A rotary solenoid is included, and when that solenoid is energized it causes the shutter to be rotated away from the opening so that the image may be projected onto the viewing screen. The rotation of the shutter is obtained during the discharge of selected capacitors through different resistors, and the time of discharge is controlled by a selected combination of resistors and capacitors. This selection can be varied by adjusting the position of a selecting switch assembly, in a manner to be described.

In the manner described, therefore, the improved assembly of the invention may be hung on the lens housing of a usual projector, and may be simply controlled to provide image projections at selected time intervals. The assembly is constructed in an improved an unique manner to include means for preventing a bouncing action of the shutter as it is moved from a closed to an open position, and vice versa. This is most important in that it provides for a single projection of each image to the screen upon each actuation of the unit.

Other features and advantages of the invention will become evident when the following description is considered in conjunction with the attached drawings, in which:

FIGURE 1 is a front elevational view of the apparatus forming one embodiment of the invention and illustrating the apertured front cover of the apparatus and the manner in which a shutter is normally disposed across that opening;

FIGURE 2 is a front elevational view of an electrical control unit to be used in conjunction with the apparatus of FIGURE 1 and which is coupled to the apparatus by means of an electric cable;

FIGURE 3 is a front elevational view of the apparatus of FIGURE 1 with the front cover removed to illustrate the shutter in more detail, and also to show components which coact with the shutter to prevent any bouncing action;

FIGURE 4 is a rear elevational view of the apparatus of FIGURE 1 with the back cover removed to reveal further details of the construction of the apparatus including a rotary solenoid which controls the shutter;

FIGURE 5 is an enlarged sectional view of the apparatus of FIGURE 1, substantially on the line 5—5 of FIGURE 1, and illustrating the manner in which the rotary solenoid is mounted on a support plate within the apparatus, and how that solenoid is coupled to the shutter;

FIGURE 6 is an enlarged sectional view substantially on the line 6—6 of FIGURE 5, the latter view illustrating in further detail the construction of certain portions of the rotary solenoid;

FIGURE 7 is an enlarged fragmentary sectional view substantially on the line 7—7 of FIGURE 6, and illustrating in further detail the construction of certain portions of the rotary solenoid;

FIGURE 8 is a circuit diagram illustrating an appropriate control system for the apparatus of the invention; and FIGURE 9 is a perspective view of a typical projector showing the apparatus of FIGURE 1 in shadow form suspended from the lens housing of the projector for the practice of the invention.

In the embodiment of the invention illustrated in the drawings, a housing is indicated generally as 10 (FIGURES 1 and 5), and this housing is formed from a casing 12 and a front cover 14. The front cover 14 is fastened to the casing 12 by a plurality of screws 15. A mounting plate 16 is positioned within the housing 10 is spaced and parallel relationship with the front cover 14. The mounting plate 16 also has integrally formed top and bottom walls which are designed to be disposed adjacent the top and bottom walls of the casing 12.

An opening 18 is formed in the rear wall of the casing 12, an opening 20 is formed in the cover 14, and an opening 22 is formed in the mounting plate 16. These openings are disposed in axial alignment with one another. The openings 18, 20 and 22 are shown in FIGURES 1 and 4 as being circular in shape, but any other suitable shape may be used. A shield 24 having a curved configuration, as shown in FIGURE 4, extends around the openings 18 and 22 in the space between the rear wall of the casing 12 and the mounting plate 16. The shield 24 is flanged, as at 26 (FIGURE 4), so as to be supported by nuts and screws 28 on the top wall of the mounting plate 16. The shield 24 forms a chamber between the mounting plate 16 and the rear wall of the casing 12. The lens housing of any appropriate projector, such as the projector 25 of FIGURE 9, may extend through the opening 18 into the housing formed by the shield 24. In this manner, the apparatus of the invention may be suspended on the lens housing 27 of the projector 25, in the manner illustrated in FIGURE 9.

A bracket 30 (FIGURE 5) is attached to the mounting plate 16 at a position below the shield 24. The bracket 30 supports a rotary solenoid, generally indicated as 32 (FIGURE 5). The rotary solenoid 32 may be of the type manufactured by the G. H. Leland Company of Cleveland, Ohio. The solenoid 32 has a casing 34 (FIGURES 5 and 7) which extends into a socket in the mounting plate 16, as best shown in FIGURE 5. The casing 34 has grooves 36 (FIGURE 7) disposed at angularly spaced positions in the vertical wall defining the front of the casing. The purpose of these grooves will be described in detail subsequently.

An armature 38 (FIGURE 5) is included in the solenoid 32 for rotation from a first angular position to a second angular position when the solenoid is energized. A spiral spring 39 is anchored at its opposite ends to the armature 38 and to the casing 34 to restore the armature to a normal position after the solenoid has been energized and subsequently de-energized. The armature 38, in turn, carries a plate 40 (FIGURES 5, 6 and 7) separated by balls 44 (FIGURE 7) from the front wall of the casing 34. The plate 40 has a plurality of raised portions 46 disposed at angularly spaced positions corresponding to the spacing between the grooves 36 and as shown in FIGURE 6. The dimensions of the raised portions 46 correspond to the dimensions of the grooves 36. The raised portions 46 are displaced from the grooves 36 for reasons which will be described in detail subsequently.

A shutter 50, which may be made from a suitable plastic material or from a suitable metal, is attached by screws 52 (FIGURES 3 and 5) to the plate 40. The shutter is positioned between the front cover 14 and the mounting plate 16. As shown in FIGURES 1, 3 and 4, for example, the shutter 50 extends upwardly at an oblique angle so as to cover the opening 20 and block the projection of light images from the lens of the projector through the openings 22 and 20. The width of the shutter 50 preferably increases toward the upper end of the shutter so as to be certain that the shutter will fully and adequately cover the opening 20.

A bumper 54 (FIGURES 3 and 5) is disposed at the upper corner of the housing 10 in abutting relationship with one edge of the shutter 50, when the shutter is in its normal position illustrated in FIGURES 1, 3 and 4. The surface of the bumper 54 contacting the shutter 50 is preferably provided with a configuration complementing the contacting edge of the shutter. A bumper 56 (FIGURE 3) is positioned on the opposite side of the shutter 50 from the bumper 54 so as to limit the pivotal movement of the shutter when the shutter is rotated by the energizing of the solenoid 32. The configuration of the top surface of the bumper 56 preferably complements that of the contacting edge of the shutter 50. The bumpers 54 and 56 may be made from a material having suitable shock absorption properties.

The mechanical features of the apparatus illustrated in FIGURES 1-7 and described above are controlled by the operation of the electrical circuitry shown in FIGURE 8. This circuitry includes a plug 60 (also shown in FIGURE 2) which may be inserted into a usual wall outlet (not shown) for supplying, for example, alternating voltage of approximately 115 volts and 60 cycles. A first terminal of the plug 60 is connected to the fixed contact of a manually operated single-pole single-throw on-off switch 62, this switch also being shown in FIGURE 2.

A neon indicating lamp 64 (also shown in FIGURE 2) is connected to a resistor 66, and these elements are connected in series between the movable arm of the switch 62 and the second terminal of the plug 60. The anode of a diode 68 is also connected to the movable arm of the switch 62. A damping resistor 70, having a suitable value such as approximately 22 ohms, has common connections at opposite terminals with the cathode of the diode 68 and with the left terminal in FIGURE 8 of a manually operated single-pole double-throw switch 72. The right stationary contact of the switch 72 in FIGURE 8 is connected to first terminals of a plurality of resistors 76, 78, 80, 82, 84, 86 and 88. These resistors have suitable values such as 8200, 2700, 1500, 68,000, 22,000, 10,000 and 8200 ohms, respectively. The resistors are respectively connected to the second, third, fourth, sixth, seventh, eighth and ninth stationary contacts of a manually operated rotary switch indicated generally as 90. The movable arm of the switch 90 may be rotated by a knob 91 (FIGURE 2) to a position engaging any selected one of the stationary contacts of the switch.

The movable arm of the switch 90 is connected to the second terminal of the plug 60, as is one terminal of a relay coil 92. The second terminal of the relay coil 92 is connected to the right stationary contact of the switch 72 in FIGURE 8. The relay coil 92 controls a pair of normally open relay contacts 94. One of these relay contacts 94 is connected to the second terminal of the plug 60, and the other is connected to one terminal of the energizing coil 32' of the rotary solenoid 32. A pair of manually operated switches 96 and 98 are connected in parallel with the relay contacts 94. The switch 96 is of the push button type, whereas the switch 98 is of the on-off type. Both of these switches are also shown in FIGURE 2.

The second terminal of the energizing coil 32' of the rotary solenoid 32 is connected to one terminal of a filter capacitor 100, this capacitor having a suitable value such as approximately 50 microfarads. The other terminal of the filter capacitor 100 has a common connection with the second terminal of the plug 60. A resistor 102 and a second filter capacitor 104 are connected in series across the capacitor 100. The resistor 102 and the capacitor 104 may have values of 1500 ohms and 50 microfarads, respectively.

A capacitor 106, having a suitable value such as approximately 50 microfarads, is connected between the second terminal of the plug 60 and the stationary contacts 1-4 of a rotary switch generally indicated as 110. The movable arms of the switches 90 and 110 are mechanically coupled for uni-control, such that they will engage corresponding stationary contacts of the two switches.

Connections are made from the movable arm of the switch 110 to the common terminal of a resistor 112 and of a capacitor 114. The resistor 112 may have a suitable value, such as approximately 100 ohms, and the capacitor 114 may have a suitable value, such as 4 microfarads. The second terminal of the resistor 112 is connected to the movable arm of the switch 72. The other terminal of the capacitor 114 is connected to the second terminal of the plug 60.

In order to set into operation the apparatus shown in the drawings and described above, the plug 60 is inserted into a wall outlet, and the switch 62 is closed. This causes current to flow through a circuit including the plug 60, the switch 62, the neon indicating lamp 64 and the resistor 66. The flow of current through this circuit causes the lamp 64 to become illuminated to indicate that the apparatus is in operation.

Current also flows through a circuit including the plug 60, the switch 62, the diode 68, the capacitors 100 and 104, and through the resistor 102. The current flows through this latter circuit in the positive half cycles only of the alternating current because of the rectifying action of the diode 68. Because of this, the filter capacitors 100 and 104 become charged to a positive value having an amplitude approaching that of the alternating current from the power source. A direct voltage appears, therefore, across the capacitor 100.

The movable arm of the switch 72 is normally in engagement with the left stationary contact of the switch in FIGURE 8, and for this position of the switch the capacitor 114 becomes charged. The charging of the capacitor 114 occurs through a circuit including the plug 60, the switch 62, the diode 68, the resistor 70, the switch 72 and the resistor 112. By including the resistors 70 and 112 in the circuit, the transient surges of the charging currents are limited to safe values. If the movable arm of the switch 110 is now in engagement with any one of the first four stationary contacts of that switch, the capacitor 106 also becomes charged. This is because the capacitor 106 is connected across the capacitor 114 when the movable arm of the switch 110 engages any one of the first four stationary contacts of the switch.

Upon manual movement of the movable arm of the switch 72 into engagement with the right stationary contact in FIGURE 8, the capacitor 114 begins to discharge (as does the capacitor 106 when it is also in circuit). This discharge of the capacitor 114 occurs through a path including the resistor 112, the switch 72 and the relay coil 92. The capacitor 106 also starts to discharge through the same path, as noted, when it is connected in the circuit by the positioning of the movable arm of the switch 110 into engagement with any one of the first four stationary contacts of that switch. The time required for discharging the capacitors 106 and 114 can be varied by adjusting the position of the movable arm of the switch 90. This places different values of resistance across the relay coil 92. The time intervals during which the relay 92 are energized can be controlled, therefore, by the appropriate adjustment of the switches 90 and 110.

The flow of discharge current through the relay coil 92 causes the relay to be energized, as noted, so that the normally open relay contacts 94 are closed. When this occurs, an energizing circuit is established through the energizing coil 32′ of the solenoid 32 from the capacitor 100 across which the direct current voltage appears. When this circuit is completed by the closure of the relay contacts 94, the solenoid 32 is energized. The solenoid may also be energized independently of the circuit described above by the manual actuation of the push button switch 96, or by the closure of the switch 98.

When the solenoid 32 becomes energized, it actuates the armature 38 towards the right in FIGURE 5. As the armature 38 moves toward the right, it drives the plate 40 (FIGURES 6 and 7) in the same direction because of the coupled relationship between these members. The movement of the plate 40 towards the right can occur only by a sliding movement of the plate in an angular direction. In the angular action of the plate 40, it tends to drive the balls 44 (FIGURE 7) into the grooves 36 in the casing 34. At the same time, the plate 40 tends to become angularly positioned so that the raised portions 46 are disposed substantially opposite from the groove 36 in the axial direction. In this manner, an axial movement of the armature 38 is converted into a rotary movement of the plate 40.

Since the shutter 50 is attached to the plate 40 by the screws 52, the shutter follows the rotary movement of the plate. This causes the shutter 40 to pivot from the position of blocking the opening 20 to a position abutting the bumper 56 of FIGURE 3. In this latter position, the shutter is moved away from the opening 20, so that an image can be projected through the opening from the lens of the projector 25 (FIGURE 9) to a viewing screen. When the opening 20 becomes unblocked by the above described movement of the shutter, it cannot become subsequently blocked by a bouncing movement of the shutter because of the damping action of the bumper 56. This is important in maintaining the image completely on the screen for the controlled period of time.

After the controlled period of time, the capacitors 106 and 114 become sufficiently discharged so that the flow of current through the relay coil 92 falls below the level necessary to hold the relay contacts 94 closed. This causes the relay contacts 94 to open so that the coil 32′ of the solenoid 32 is de-energized. Since the solenoid 32 is no longer energized, the spiral spring 39 (FIGURE 5) acts upon the rotary plate 40 to return the plate to its position shown in FIGURES 5 and 7. The shutter 50 follows the angular movements of the plate 40 and returns to its position abutting the bumper 54. The bumper 54 acts to prevent the shutter 50 from bouncing back from the bumper. In this manner, the opening 20 cannot become partially unblocked to aid the reader in getting an unscheduled additional glimpse at the written material projected on the screen.

As has been described above, the solenoid 32 is energized during the discharge of the capacitors 106 and 114 through a circuit including the relay coil 92. The capacitor 106, as mentioned above, is actually in the circuit only in the first four positions of the switches 90 and 110. Because of the relatively large value of the capacitor 106, the discharge of the capacitors 106 and 114 takes a relatively long time. The longest time required for the discharge of the capacitors 106 and 114 is in the first position of the switches 90 and 110. The reason for this is that no resistance is connected across the relay coil 92 in this switch position to lower the effective impedance of the coil.

In the second position of the switches 90 and 110, the capacitor 106 is still in the circuit and the coil 92 is connected across the resistor 76, which may have a value of approximately 8200 ohms. By connecting the resistor 76 across the coil 92, the effective impedance of the coil becomes lowered so that the capacitors 106 and 114 do not require as long a time to discharge through the coil. In like manner, in the third and fourth positions of the switches 90 and 110, resistances having even lower values are connected across the relay coil 92 further to decrease the required discharge time of the capacitors 106 and 114.

In the fifth and successive positions of the switches 90 and 110, the capacitor 106 is no longer connected in shunt with the capacitor 114. Since the capacitor 114 has a value of approximately only 4 microfarads, the time required for the capacitor 114 to discharge is relatively short.

The discharge times of the capacitor 114 decreases progressively for successive positions of the switches 90 and 110 after the fifth position. This results from the fact that the resistance values connected across the relay coil 92 decreases progressively from a value approaching infinity in the fifth position of the switches 90 and 110 to a value of approximately only 8200 ohms in the last position of the switches.

Because of the different times required for the capacitors 106 and 114 to discharge in the various positions of the switches 90 and 110, corresponding selections can be made for the time intervals during which an image is projected onto the viewing screen. In the first four positions of the switches 90 and 110, the image is projected on the screen for an average person to make a multiple number of fixations on the screen. A "fixation" may be defined as the time required by the human eye and brain to read and absorb a word or group of words. Actually, a group of words can be read and absorbed in a single fixation since this is the way people tend to read.

At the fifth position of the switches 90 and 110, the threshold of a single fixation is reached. In this switch position, the shutter 50 is open for a sufficient length of time so that an average person can make only a small fixation. Only a small percentage of persons can make more than one fixation during the time that the shutter 50 is open in the fifth position of the switches 90 and 110. This latter time interval may be approximately 1/10 of a second. In the positions after the fifth position of the switches 90 and 110, the shutter 50 is open for a period of time less than that normally required for a person to make a single fixation.

It may sometimes be desired to project an image on the viewing screen for a prolonged period of time. This may be accomplished by closing the switch 98. As noted above, the closure of the switch 98 causes the energizing coil 32' of the solenoid 32 to become energized. As also described previously, the shutter 50 is opened during the time that the solenoid 32 is energized. The solenoid 32 can be energized intermittently or for short intervals by the actuation of the push button switch 96.

The invention provides, therefore, an improved apparatus which, as shown in FIGURE 9, may be conveniently suspended from the lens housing of any commercial projector. This provides a simple and expeditious means of converting the projector into a tachistoscope instrument. The apparatus described is advantageous in that it operates reliably to control the time intervals during which an image is projected onto the screen. By providing such a control, an effective aid is obtained when testing people for their reading ability and in teaching them to improve their reading skill. As noted, the apparatus of the invention is most advantageous in that it is simple in its construction, and reliable and inexpensive.

I claim:

1. A tachistoscope assembly including: a casing having a front cover and a rear wall, said front cover and rear wall having respectively axially aligned openings therein through which images may be projected to a viewing screen, tubular shielding means extending from the rear wall and coaxial with said opening therein for receiving an image projecting means through the opening in said rear wall, solenoid means including an energizing coil and mounted in said casing, shutter means coupled to the solenoid means and movable thereby from a first position in which the shutter is interposed between the openings in the front cover and in the rear wall to a second position in which the shutter is out of the optical path through said opening upon the flow of electric current through the energizing coil, spring means coupled to the shutter means and to the casing for returning the shutter means to its first position upon the termination of such current flow through the energizing coil, a source of direct current potential having a first terminal and a second terminal, first circuit means for connecting the solenoid energizing coil across the source and including a relay actuated switch, an energizing relay coil for the relay actuated switch for closing the same to complete an energizing circuit to the solenoid energizing coil from said source when the relay coil is energized, second circuit means for connecting the energizing relay coil across said source and including capacitance means having a first terminal connected to a first terminal of the relay coil and to the first terminal of said source and further including a single-pole double-throw switch, said circuit means further including means for connecting a first fixed contact of the single-pole double-throw switch to the other terminal of the relay coil and means for connecting a second fixed contact of the single-pole double-throw switch to the second terminal of said source and means for connecting a movable contact of the single-pole double-throw switch to a second terminal of the capacitance means, so that a first operating position of the single-pole double-throw switch causes a charge to flow from said source into said capacitance means and a second operating position of said single-pole double-throw switch causes a charge in the capacitance means to discharge current through the relay coil and energize the same, resistance means connected to the relay coil, and control means for selectively controlling the resistance value of said resistance means to control the time of flow of the discharge current from said capacitance means and thereby control the time of current flow through the solenoid coil.

2. The system defined in claim 1 and in which the resistance means includes a plurality of resistors of different values each having a first terminal connected to one terminal of the relay coil, and in which the control means includes a switch having a plurality of fixed contacts connected to respective ones of the resistors and a movable contact connected to the other terminal of said relay coil.

3. A tachistoscope assembly including: a casing having a front cover and a rear wall and having a mounting plate disposed between the front cover and the rear wall, said front cover and mounting plate and rear wall having respective axially aligned openings therein through which images may be projected to a viewing screen, a cylindrical shaped shielding member disposed between the mounting plate and the rear wall in coaxial relationship with said openings therein for receiving an image projecting means through the opening in said rear wall, rotary solenoid means mounted on said mounting plate and including a energizing coil, shutter means mechanically coupled to said solenoid means and movable thereby from a first position in which the shutter means is interposed between the openings in the front cover and in the mounting plate to a second position in which the shutter is displaced from such openings upon the flow of electric current through the energizing coil, spring means coupled to the shutter means and to the casing for returning the shutter means to its first position upon the termination of such current flow through the energizing coil, first and second shock absorbing means positioned in said casing to be respectively engaged by said shutter means as the same is pivotally moved to said first position by said spring means and to said second position by said solenoid means to prevent bouncing of the shutter means, a source of direct current potential including a rectifying diode means and including means for connecting the diode across an alternating current source and further including a first terminal and a second terminal, first circuit means for connecting the energizing coil of the solenoid means across said direct current source and including a relay actuated switch, an energizing relay coil for the relay actuated switch for closing the same to complete an energizing circuit for the energizing coil of the solenoid means from said direct current source when the relay coil is energized, a manually operated switch included in the first circuit means and connected in parallel with the relay actuated switch for providing a continuous activation to the energizing coil of the solenoid means for manually controlled intervals, a second circuit means for connecting the energizing coil of the solenoid means across said direct current source and including capacitance means having a first terminal connected to a first terminal of said relay coil and to the first terminal of said source and further including a single-pole double-throw switch, said second circuit means further including means for connecting a first fixed contact of the single-pole double-throw switch to the other terminal of the relay coil and means for connecting a second fixed contact of the single-pole double-throw switch to the second terminal of said direct current source and means for connecting a movable contact of the single-pole double-throw switch to a second terminal of the capacitance means, so that a first operating position of the single-pole double-throw switch causes a charge to flow from said direct current source into said capacitance means and a second operating position of said single-pole double-throw switch causes the charge in the capacitance means to discharge current through the relay coil and energize the same, resistance means connected to the relay coil, and control means for selectively controlling the resistance value of said resistance means to control the time of flow of the discharge current from said capacitance means through said relay coil and thereby control the time of current flow through the energizing coil of the solenoid means.

4. A tachistoscope assembly including: a casing having a front cover and a rear wall, said front cover and rear wall having respectively axially aligned openings therein through which images may be projected to a viewing screen, tubular shielding means extending from the rear wall and coaxial with said opening therein for receiving an image projecting means through the opening in said rear wall, a solenoid means including an energizing coil mounted in said casing, shutter means coupled to the solenoid means and movable thereby from a first position in which the shutter means is interposed between the openings in the front cover and in the rear wall to a second position in which the shutter is out of the optical path through said opening, said solenoid means being movable from said first position to said second position upon the flow of electric current through the energizing coil, and spring means coupled to said shutter means and to said casing for returning said shutter means to its first position upon the termination of such current flow through said energizing coil.

5. A tachistoscope assembly including: a casing having a front cover and a rear wall and having a mounting plate disposed between the front cover and the rear wall, said front cover and mounting plate and rear wall having respective axially aligned openings therein through which images may be projected to a viewing screen, a cylindrical-shaped shielding member disposed between the mounting plate and the rear wall in coaxial relationship with said openings therein for receiving an image projecting means through the opening in said rear wall, rotary solenoid means mounted on said mounting plate and including an energizing coil, shutter means mechanically coupled to said solenoid means and pivotally movable thereby from a first angular position in which the shutter means is interposed between the openings in the front cover and in the mounting plate to a second angular position in which the shutter is displaced from such openings, said shutter means being movable from said first angular position to said second angular position upon the flow of electric current through the energizing coil, spring means coupled to said shutter means and to the casing for returning said shutter means to its first position upon the termination of such current flow through the energizing coil, and first and second shock absorbing means positioned in said casing to be respectively engaged by said shutter means as the same is pivotally moved to said first angular position by said spring means and to said second angular position by said solenoid means so as to prevent bouncing of said shutter means.

References Cited in the file of this patent

UNITED STATES PATENTS

| | | |
|---|---|---|
| 2,480,678 | Skudre | Aug. 30, 1949 |
| 2,528,855 | Cadwell et al. | Nov. 7, 1950 |
| 2,590,101 | Henschke et al. | Mar. 25, 1952 |
| 2,594,520 | Tiedman | Apr. 29, 1952 |
| 2,691,707 | Lovejoy | Oct. 12, 1954 |
| 2,730,937 | Martin et al. | Jan. 17, 1956 |

FOREIGN PATENTS

| | | |
|---|---|---|
| 1,018,296 | France | Oct. 15, 1952 |